(12) United States Patent
Stomakhin et al.

(10) Patent No.: US 11,455,780 B2
(45) Date of Patent: Sep. 27, 2022

(54) GRAPHICAL USER INTERFACE FOR CREATING DATA STRUCTURES USED FOR COMPUTING SIMULATED SURFACES FOR ANIMATION GENERATION AND OTHER PURPOSE

(71) Applicant: Unity Technologies SF, San Francisco, CA (US)

(72) Inventors: Alexey Stomakhin, Waimanalo, HI (US); Daniel Martin Elliott Jones, Wellington (NZ)

(*) Notice: Subject to any disclaimer, the term of this patent is extended or adjusted under 35 U.S.C. 154(b) by 0 days.

(21) Appl. No.: 17/184,402

(22) Filed: Feb. 24, 2021

(65) Prior Publication Data
US 2021/0272378 A1 Sep. 2, 2021

Related U.S. Application Data

(60) Provisional application No. 62/983,534, filed on Feb. 28, 2020.

(51) Int. Cl.
| | |
|---|---|
| *G06T 19/20* | (2011.01) |
| *G06T 17/00* | (2006.01) |
| *G06F 9/30* | (2018.01) |
| *G06F 9/38* | (2018.01) |
| *G06T 11/40* | (2006.01) |
| *G06T 13/20* | (2011.01) |
| *G06T 13/80* | (2011.01) |

(52) U.S. Cl.
CPC .......... *G06T 19/20* (2013.01); *G06F 9/30036* (2013.01); *G06F 9/30043* (2013.01); *G06F 9/3836* (2013.01); *G06T 11/40* (2013.01); *G06T 13/20* (2013.01); *G06T 13/80* (2013.01); *G06T 17/00* (2013.01); *G06T 2200/04* (2013.01); *G06T 2200/24* (2013.01); *G06T 2207/10028* (2013.01)

(58) Field of Classification Search
CPC ..................... G06T 19/20; G06T 17/00; G06T 2207/10028; G06T 2200/04; G06T 2200/24
See application file for complete search history.

(56) References Cited

U.S. PATENT DOCUMENTS

| | | |
|---|---|---|
| 8,199,148 B2 | 6/2012 | Museth |
| 2009/0040219 A1 | 2/2009 | Museth |
| (Continued) | | |

OTHER PUBLICATIONS

Muller, M., Chentanez, N., Solid Simulation with Oriented Particles, Jul. 2011, ACM Transactions on Graphics, vol. 30, Article 92, pp. 1-9. (Year: 2011).*

(Continued)

*Primary Examiner* — Said Broome

(57) ABSTRACT

A graphical user interface (GUI) is configured for displaying surfaces of simulated objects within a scene. The GUI comprises a selector to choose between displaying the scene as: a plurality of particles, wherein each particle comprises a plurality of attributes; a plurality of ellipsoids formed from the plurality of particles, wherein dimensions and orientation of each ellipsoid depend on the number and direction of neighboring ellipsoids within a search radius of the ellipsoid; or one or more splatted or rasterized surfaces formed from the plurality of ellipsoids. The GUI further includes a display window within which the GUI displays the scene.

40 Claims, 15 Drawing Sheets

(56) References Cited

U.S. PATENT DOCUMENTS

| | | | |
|---|---|---|---|
| 2011/0282641 A1* | 11/2011 | Xenos | G06F 30/20 |
| | | | 703/19 |
| 2013/0187930 A1 | 7/2013 | Millman | |
| 2014/0168251 A1 | 6/2014 | Adachi et al. | |
| 2015/0109289 A1 | 4/2015 | Mueller-Fischer et al. | |
| 2019/0019345 A1 | 1/2019 | Chentanez et al. | |

OTHER PUBLICATIONS

Yu et al., Reconstructing Surfaces of Particle-Based Fluids Using Anisotropic Kernel, ACM Trans. Graph. 32, 1, Article 5 (Jan. 2013), 12 pages.

Kessy et al., "Optimal Whitening and Decorrelation," Dec. 17, 2016, The American Statistician, pp. 1-14, 2016.

Wei et al., Adaptive Square-Root Unscented Particle Filtering Algorithm for Dynamic Navigation, Jul. 18, 2018, Sensor Fusion and Novel Technologies in Positioning and Navigation, pp. 1-15. [https://www.mdpi.com/1424-8220/18/2337/pdf.].

International Search Report and Written Opinion dated Jun. 9, 2021 for International Application No. PCT/NZ2021/050030.

International Search Report and Written Opinion dated Jun. 11, 2021 for International Application No. PCT/NZ2021/050031.

* cited by examiner

GRAPHICAL USER INTERFACE FOR CREATING DATA STRUCTURES USED FOR COMPUTING SIMULATED SURFACES FOR ANIMATION GENERATION AND OTHER PURPOSE

CROSS REFERENCE TO RELATED APPLICATIONS

This application claims the priority benefit of U.S. Provisional Patent Application No. 62/983,534 filed Feb. 28, 2020, hereby incorporated by reference in its entirety as though fully set forth herein.

FIELD

The present disclosure generally relates to simulation for animation and other purposes and more particularly to efficient computation of surfaces of interacting simulated objects.

BACKGROUND

Visual representations of scenes intended to reflect real-world scenarios are common in animation and other fields. For example, a computer-generated imagery scene could be created by having an artist manually draw a sequence of frames to form a video sequence. For simple cartoons, for example, this is a feasible approach. However, as viewers have come to expect more complex visuals, there is a need for computer-driven imagery generation. Some of that computer-driven imagery generation might rely on simulation.

Computer simulation that is used for imagery generation has been used to animate natural phenomena as well as natural movements of characters, such as by using a physics engine to output movements of an articulated character that are consistent with real-world physics and joint constraints. In some ways, this is often a simple problem—how to determine natural-looking movements of at most a few dozen attached body parts. For other simulations, such as those with flexible objects, fluids, and the like, the number of degrees of freedom of individual units is much greater and typically computer simulation requires a trade-off between realism, resolution, and amount of computing resources available. Because of this trade-off, efficient computer simulation techniques can be important as they might allow for an increase in realism and/or resolution without requiring significant increases in computing resources. Simulation computations involving fluid surface features and other fluid interactions can often involve such trade-offs.

Imagery (e.g., animation frames, still images, etc.) generated to represent simulated objects, and the simulated objects themselves, can be created in computer-readable form, either procedurally or manually. For example, an image of a sphere might be generated procedurally from a user input of a center location, a radius parameter, and a color. In another example, a more complex object might be generated procedurally from a set of parameters and a set of procedural rules for object creation. Objects might also be created manually, such as by having an artist draw into a computer system the shape of an object. In some cases, an artist might manually adjust a procedurally-generated object. In many instances, it might be preferred to maintain a procedural representation of objects further into an imagery generation process so that editors have more opportunities to make adjustments at a procedural level rather than manual touch-ups.

A weighted principal component analysis process has been proposed in Koren, et al. (Koren, Y. and Carmel, L., "Visualization of Labeled Data using Linear Transformations", in Proceedings of IEEE Information Visualization, vol. 00:16, 2003) herein "[Koren]").

Weighted covariance matrices have been proposed in Yu, J., and Turk, G., "Reconstructing Surfaces of Particle-Based Fluids Using Anisotropic Kernels", ACM Transactions on Graphics (TOG), No. 5 (February 2013)(hereinafter "[Yu]").

SUMMARY

A simulation system as described herein can process a procedural representation of objects simulated by particles to provide representations of object surfaces as described herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a graphical user interface (GUI) for displaying surfaces of simulated objects within a scene. The graphical user interface includes a selector to choose between displaying the scene as: (1) a plurality of particles, where each particle includes a plurality of attributes; (2) a plurality of ellipsoids formed from the plurality of particles, where dimensions and orientation of each ellipsoid depend on a number and direction of neighboring ellipsoids within a search radius of the ellipsoid; or (3) one or more splatted or rasterized surfaces formed from the plurality of ellipsoids. The graphical user interface also includes a display window within which the GUI displays the scene. Other embodiments of this aspect include corresponding computer systems, apparatus, and computer programs recorded on one or more computer storage devices, each configured to perform the actions of the GUI.

Implementations may include one or more of the following features. The GUI further including a selector for selecting a voxel size or particle size for the plurality of particles. The GUI further including a selector for selecting the search radius. The GUI further including a selector to choose whether to make the search radius proportional to the particle size. The GUI wherein the plurality of attributes includes at least one of an X-coordinate, a Y-coordinate, a Z-coordinate, an anisotropy matrix, a rotation matrix, a size, a color, a maximum elongation, a position smoothing, a volume normalization, or a global size scaling. The GUI further including a masking control that enable a user to define a neighborhood of particles. The GUI further including one or more artistic controls that enable the user to manipulate one or more attributes of particles within the neighborhood of particles. The GUI wherein the expression defines a relationship between a first attribute of the plurality of attributes and a second attribute of the plurality of attributes. The GUI wherein the expression includes one or more arithmetic operations. The GUI wherein the expression includes one or more constants. The GUI further including a selector to select whether the expression affects the plurality of particles globally or per-particle. The GUI further including a selector to select whether to display the scene in black and white or color. The GUI wherein the selector to choose between displaying the scene is further configured to select to display the scene as (4) a rendered scene. The GUI further including a selector to select whether to render the scene with a maximum number of vertices per traced light path.

The GUI wherein the scene is two-dimensional or three-dimensional.

Implementations of the described techniques may include hardware, a method or process, or computer software on a computer-accessible medium, including the following examples. A computer system including: one or more processors; and a storage medium storing instructions, which when executed by the one or more processors, cause the computer system to implement the GUI. A non-transitory computer-readable storage medium storing instructions, which when executed by at least one processor of a computer system, causes the computer system to implement the GUI. A carrier medium carrying image data of the scene that has been processed by the GUI.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1A:
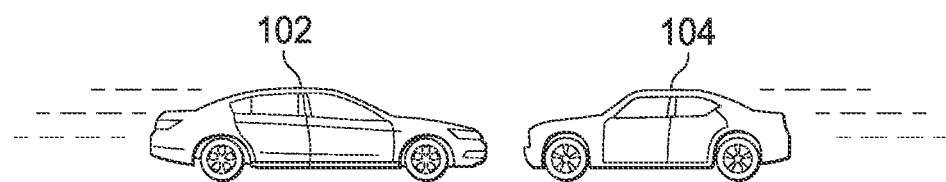
FIG. 1A illustrates an example of objects interacting that might be the subject of simulations.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In many of the examples described herein, inputs to a computer simulation system include parameters about the virtual material/object/fluid/etc. being simulated, and the output of a computer simulation includes the positions/mass/movement/etc. of the virtual material/object/fluid/etc. Such an output might be an input to an animation system, which can provide for rendering computer-generated imagery of the virtual material/object/fluid/etc. present in a scene in a virtual space. The computer-generated imagery might be still images, stereoscopic images, video sequences, and/or stereoscopic video sequences.

In some cases, the computer simulation of virtual elements seeks to match what would happen with corresponding real-world elements, but in other cases, artistic or other inputs are used in the computer simulation to create effects that do not correspond to anything in the real-world, or at least anything in available physical environments. For example, in a given simulation, an operator of a simulation engine might provide an input that corresponds to gravity "turning off" for a short period of time, which can be simulated but has no real-world correspondence. In another example, a block of water might be created that prior to an initial instant is constrained to be a particular shape, such as water being held behind a virtual dam or a cube of water with nothing holding it in that shape, and then the simulation begins with the water moving according to gravitational or surface tension constraints.

The present disclosure aids substantially in the computation and rendering of object surfaces, by improving the appearance of surfaces and reducing the resources required to render and store them. Implemented on a computing system in conjunction with a simulation system or 3D scanning system, the surface computation method disclosed herein provides a practical means of computing surfaces for objects that are modeled as collections of particles. This improved surface computation transforms a less realistic, more resource-intensive modeling and rendering process into a more realistic, less resource-intensive process, without the normally routine need for an artist or animator to apply manual corrections. This unconventional approach improves the functioning of the simulation and rendering system.

The surface computation method may be implemented as a software program, at least some outputs of which may be viewable on a display, and operated by a control process executing on a processor that accepts user inputs from a keyboard, mouse, or touchscreen interface, and that may be in communication with a rendering process and a simulation or 3D scanning process. In that regard, the software program performs certain specific operations in response to different inputs or selections made at different times. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the surface computation method. Certain features may be added, removed, or modified without departing from the spirit of the claimed subject matter.

FIG. 1A illustrates an example of objects interacting that might be the subject of simulations. In this example, a first vehicle 102 is moving to the right and a second vehicle 104 is moving to the left. A simulation might be performed to determine how the vehicles interact when they eventually collide, and a visualization might include a rendering of the surfaces of those vehicles as the surfaces are deformed due to the collision.

Figure 1B:
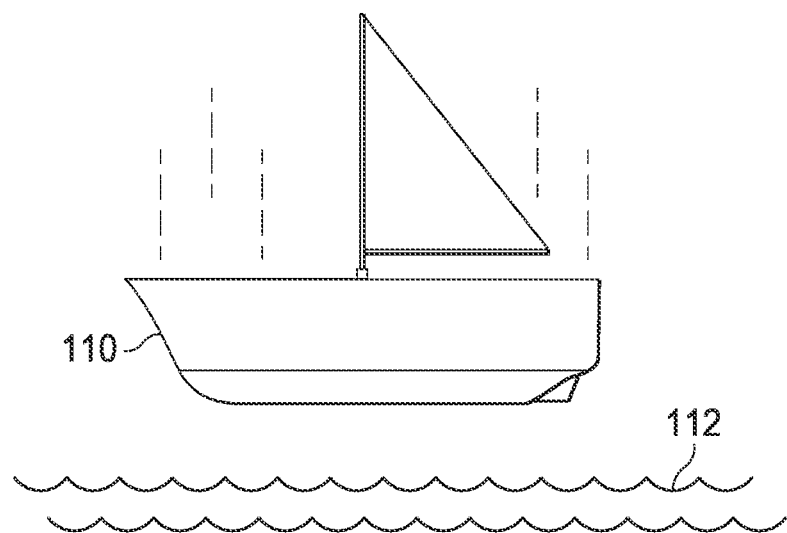
FIG. 1B illustrates an example of objects interacting that might be the subject of simulations.

FIG. 1B illustrates an example of objects interacting that might be the subject of simulations. In this example, a boat 110 interacts with, and floats on the surface of, a body of water 112. A simulation might be performed to determine the propagation and interaction of waves along the surface of the water 112, and the rolling, pitching, and yawing movements of the boat 110 under the influence of these waves. A visualization might include the rendering of the complex surface of the water 110 as the waves reflect from, and refract around, the boat 110.

Figure 1C:
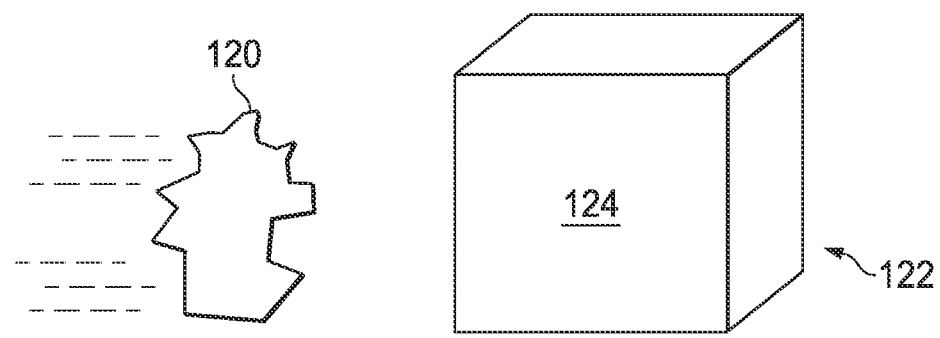
FIG. 1C illustrates an example of objects interacting that might be the subject of simulations.

FIG. 1C illustrates an example of objects interacting that might be the subject of simulations. In particular, FIG. 1C illustrates an object 120 intersecting a cube of fluid 122 at a surface 124. In each case, representative visualizations of interactions of objects that change their surfaces might use a simulation to determine the interactions, and then a visualization would use the resulting surface changes for visualizing the interaction. The object 120 might for example be a single solid object (e.g., a car body or boat hull), or might be made up of a fluid (e.g., water, sand, etc.) or semisolid (e.g., deformable metal, etc.) that may be represented as a collection of particles.

Figure 2:
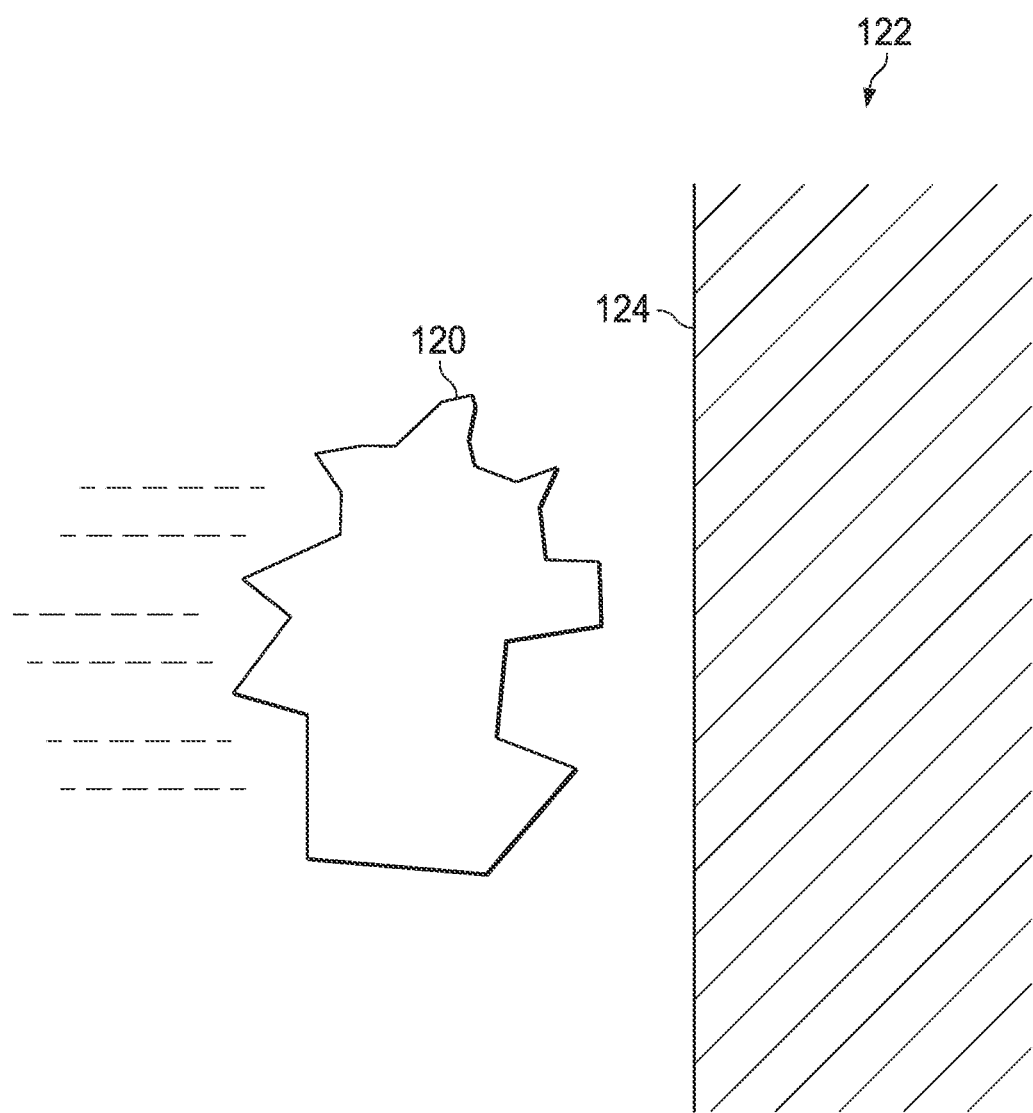
FIG. 2 is a two-dimensional view of an interaction of an object and a surface of a fluid.

FIG. 2 is a two-dimensional view of an interaction of the object 120 and the surface 124 of the fluid 122. If the fluid 122 is maintained in place by gravity, the view of FIG. 2 might be rotated to illustrate the object 120 falling into the fluid 122. Either way, a simulation may consider the interactions of the elements of the simulation, and a visualization may accurately render the resulting complex surfaces.

Figure 3:
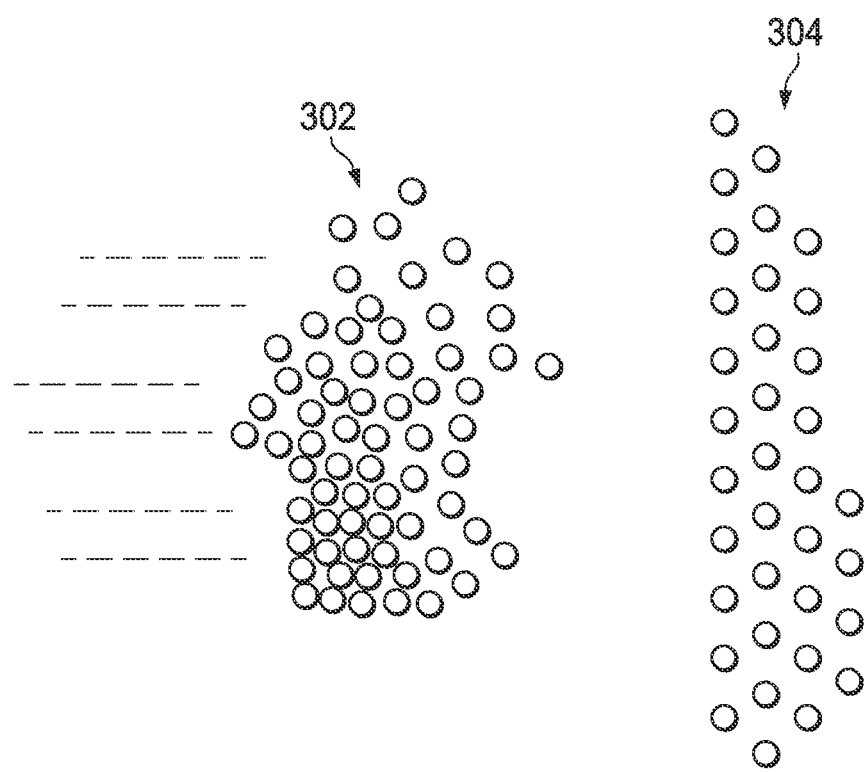
FIG. 3 illustrates a particle representation of a fluid object falling into another fluid.

FIG. 3 illustrates a particle representation of the object 120 falling into the fluid 122. A simulator might generate particle representations of objects, such as a particle representation 302 of the object 120 and a particle representation 304 of the fluid 122. In this example, object 120 is treated as being a fluid, as for example, water falling into water, albeit shown having an arbitrary shape in the figure for purposes of illustration. The simulator can compute particle-particle interactions to determine how the particles might move.

Figure 4B:
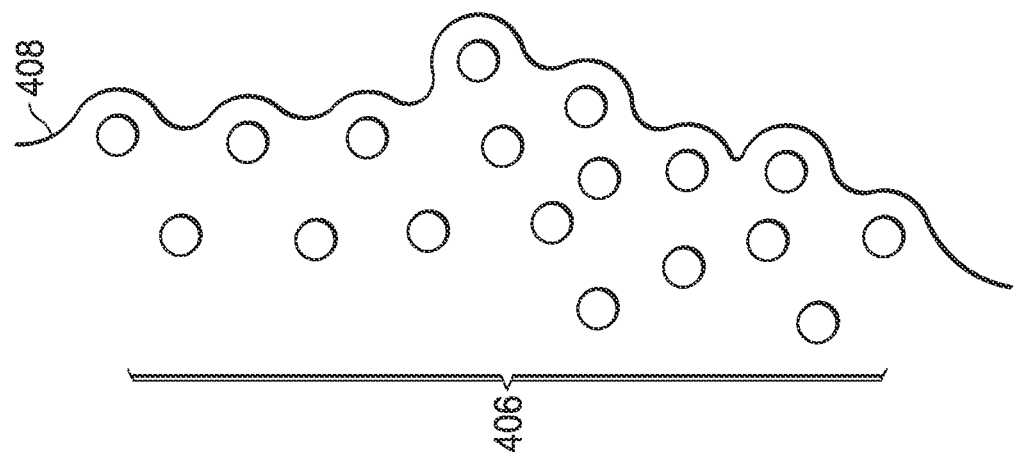
FIG. 4B illustrates an implicit surface that may be computed based on the locations and surfaces of a plurality of particles.
Figure 4A:
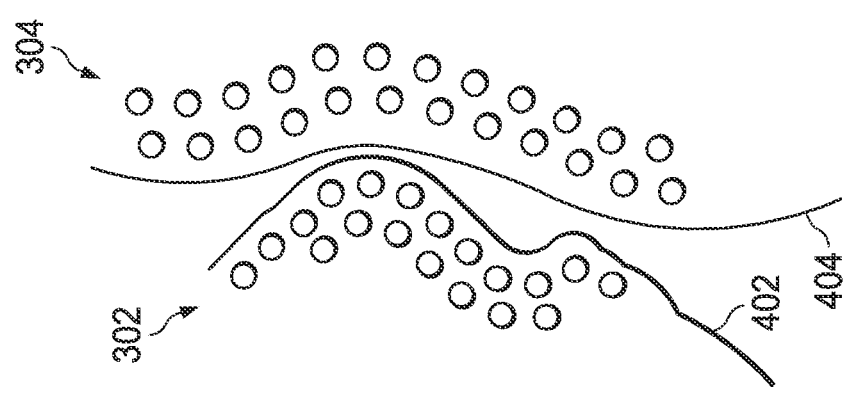
FIG. 4A illustrates movement of particles.

FIG. 4A illustrates movement of the particles 302 and 304 of FIG. 3. In this example, the simulator simulates movement of particles of the particle representation 302 and the particle representation 304 as a result of a collision or other interaction. From the moved particles, it is often desired to determine resulting surfaces, such as a surface 402 of the object 120 once deformed and a surface 404 of the fluid 122 once deformed. FIG. 4A illustrates where these smooth surfaces 402 and 404 might be at a particular moment during the collision, wherein the positions or shapes of the surfaces have changed as a result of the collision or other interaction.

FIG. 4B illustrates an implicit surface 408 that may be computed based on the locations and surfaces of a plurality of particles 406. The surfaces of the particles may for example be spherical surfaces based on a particle radius, or other surfaces determined by a particle's shape, size, and orientation. As illustrated, the surface 408 appears bumpy due to the particle representation, and a visualization might require a smoother surface, such as those illustrated in FIG. 4A. A smoother surface may for example make the rendering of the surface more realistic, more visually appealing, and/or computationally simpler.

In a simulation, a simulator might generate particle representations of objects, where each particle is treated as a solid object having a position, a mass, and a radius, among other parameters. The simulator can then run a simulation of particle interactions. While representing an object with many small particles might make resulting surfaces smoother, such an approach may come at a computational cost. With a smaller number of larger particles, the resulting computed surfaces may be bumpier, but can be smoothed by changing representations of particles as described herein. In some embodiments, such changes are handled in a way that does not introduce visual or computational artifacts.

In one simulation process, shapes of a particle in a particle representation are adjusted based on whether the particle is near a surface or is well within the object (e.g., well surrounded by neighbor particles). In an adjustment process, particle shapes and possible positions may be changed, and an implicit surface can be determined from the modified particle representations. Preferably, the resulting shapes correspond closely to what they would be if the simulation were not a particle simulation, or if it were a particle simulation involving many more particles. For example, it might be desirable that the resulting surfaces from the simulation be touching if they would be touching at full resolution, and that the particle modifications to smooth the surfaces do not undesirably modify the object shapes or volumes. Once the simulated surfaces or implicit surfaces are determined, they can be stored or provided to an animation system. More details of an example modification process to smooth surfaces is described below.

The simulator, or a portion thereof or add-on thereto, reconstructs surfaces of objects (which can be solid, semi-solid, fluids, etc.) from particle-based simulations. This can be used in animation. Prior to simulating an interaction between two objects (or an object and a fluid, or two fluids, etc.), the simulator determines a particle representation of each object and then simulates those particles interacting and determines where the surfaces of those objects would be, based on particle movements. In some cases, interaction is between a solid object and a fluid, so the particles of the solid object might not move relative to each other, in which case its surface does not need to be reconstructed and the particles of the fluid move relative to each other based on forces imposed by gravity, the fluid itself and the solid object, etc. With each particle having parameters such as radii, masses and locations, density and pressure can be calculated and forces on particles determined. Thus, a task to be performed by the surface computation method is to determine a modified particle representation from which a surface 408, implicit or otherwise, can be computed.

In one such modified representation, particles 406 are simulated as spheres, but then are transformed based on a neighborhood and a kernel. This might be done using a weighted principal component analysis process, such as that proposed in [Koren] to compute a weighted covariance matrix C for each particle, with a zero empirical mean and a set of eigenvectors representing particle orientations, and/or a weighted covariance matrix C as proposed in [Yu].

In this approach, a weighted mean and a covariance matrix of each particle is computed. This might be as shown in Equations 1 and 2, where $w_{ij}$ is an isotropic weighting function and $x_i$ is a position of particle i.

$$C_i = \sum_j w_{ij}(x_j - x_i^w)(x_j - x_i^w)^T / \sum_j w_{ij} \quad \text{(Eqn. 1)}$$

$$x_i^w = \sum_j w_{ij} x_j / \sum_j w_{ij} \quad \text{(Eqn. 2)}$$

The function $w_{ij}$ might be as in Equation 3, with $r_i$ being a user-defined search radius.

$$w_{ij} = \begin{cases} 1 - (\|x_i - x_j\|)/r_i)^3 & \text{if } \|x_i - x_j\| < r_i \\ 0 & \text{otherwise} \end{cases} \quad \text{(Eqn. 3)}$$

A singular value decomposition of $C_i$ corresponds to transformation of spherical particle i (e.g., a particle 406) into an ellipsoidal particle 40 to account for being near a surface of the particle representation. From this, an orthogonal rotation matrix, $R_i$, and diagonal stretch matrix, $\Sigma_i$, could be computed through a singular value decomposition such that $C_i = R_i^T * \Sigma_i * R_i$.

An improved anisotropy matrix, $G_i$, may then be computed for each particle i, according to Equation 4, wherein $\Sigma_i^{-1/2}$ is one over the square root of a diagonal stretch matrix of neighboring particles (e.g., particles that are neighbors of particle i).

$$G_i = R_i(\Sigma_i^{-1/2}) \quad \text{(Eqn. 4)}$$

Using the above, a spherical particle i is transformed linearly by $G_i$ to form an ellipsoid to smooth the object's surface 408, thus yielding a smoothed surface 410. From the computed values of $G_i$, anisotropic kernels, the scalar $W_i$, can be computed according to Equation 5, where P is a spherical kernel, such as the positive scalar value P(x)=1−x/2, for 0<=x<2 and 0 otherwise.

$$W_i(r, G_i) = \sigma P(\|G_i r\|) \quad \text{(Eqn. 5)}$$

A representation of the modified (e.g., smoothed) surface 410 can then be computed as an isosurface of the scalar field according to Equation 6.

$$\phi(x) = \Sigma_j W(x - \bar{x}_j, G_j) \quad \text{(Eqn. 6)}$$

In an alternative embodiment, a representation of the modified surface 410 might be instead computed according to Equation 7.

$$\phi(x) = \max_j(W(x - \bar{x}_j, G_j)) \quad \text{(Eqn. 7)}$$

In some embodiments, a module that receives inputs representing details of a scene might returns a representation of a surface, such as an isosurface. In some embodiments, the module might receive an input argument representing a position in a scene and return a signed distance field value, wherein the signed distance field value represents a distance from the input argument position to a computed surface. In such embodiments, the surface might not be computed directly, but can be inferred from input argument positions that return a signed distance field value of zero or near zero. In some examples, a signed distance field value is near zero for points near an implied surface, is negative at points deemed to be inside an object for which the implied surface is a surface, and is positive at points deemed to be outside that object's surface.

Figure 4C:
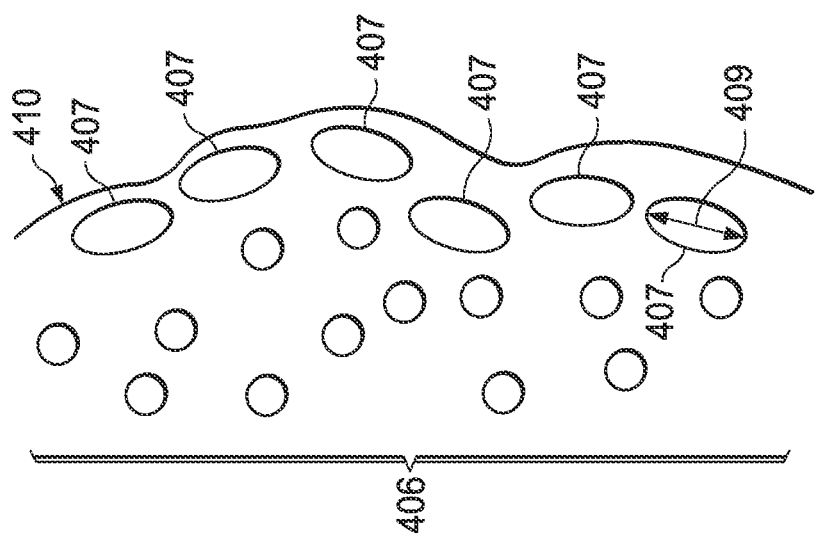
FIG. 4C shows a modified surface that has been generated by the surface computation method.

FIG. 4C shows a modified (e.g., smoothed) implicit surface 410 that has been generated by the surface computation method of the present application. As described above, particles 406 that are near a surface of the object (for example, particles that are not surrounded by neighbors on all sides) are transformed from spheres into ellipsoids 407. For example, the ellipsoids 407 may have axes 409 that are parallel to the surface of the object. These axes 409 may be elongated by the surface computation method, such that (a) the particles 406 near the surface 410 occupy a greater portion of the surface, (b) the gaps between the ellipsoids 407 are smaller than the gaps between the unmodified particles 406, and/or (c) the outer surfaces of the ellipsoids present a flatter, less peaked profile with respect to the object surface. As a result, an implicit surface 410 that is derived from the ellipsoids 407 may be smoother than an implicit surface 408 that is derived from the unmodified particles 406. A smoother surface may in some cases be advantageous, for example by being more realistic, more visually appealing, less computationally intensive or memory/storage intensive, etc.

The process of determining a splatted or rasterized surface (e.g., an implicit surface 408 as shown for example in FIG. 4B, or a smoothed surface 410 as shown for example in FIG. 4C) is described with reference to simulation, but it might also be the case that the particle representation for which a surface is to be determined is obtain for other than simulation purposes. For example, an object (fluid or otherwise) might be represented by a point cloud obtained from a scanning device that generates point clouds from physical objects, such as a 3D laser scan, and the methods described herein could be used to reconstruct a surface of such an object.

Figure 5:
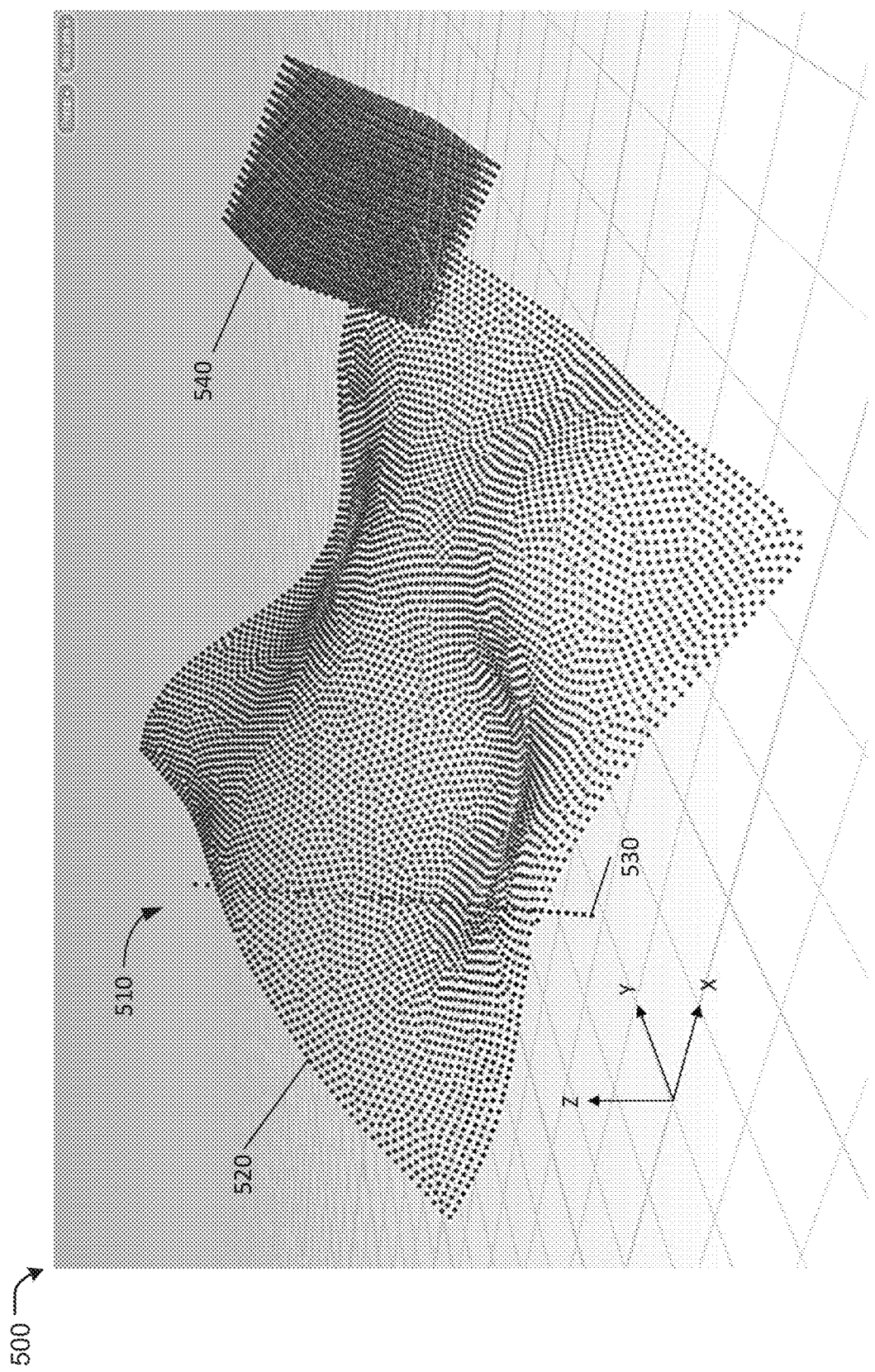
FIG. 5 illustrates an example scene that may for example be the output of a simulation, a sensor, or a human artist, in accordance with at least one embodiment of the present disclosure.

FIG. 5 illustrates an example scene 500 that may for example be the output of a simulation, a sensor (e.g., a 3D camera), or a human artist, in accordance with at least one embodiment of the present disclosure. At this stage of development, the scene 500 comprises a point cloud or plurality of particles describing three different fluid example shapes: a wave 520, a vertical spout 530, and a cube. In general, the vertical spout 530 is a convoluted 1D feature, whereas the wave 520 is a convoluted 2D feature, and the cube 540 is a 3D feature. Scenes may include any combination of 1D, 2D, and 3D objects or features, viewable and manipulable within a Graphical User Interface (GUI). By showing these features as a point cloud or plurality of particles, the system enables an artist to see the shapes, positions, orientations, and other attributes of the particles, as well as interactions of the various objects or features, or the voxel size of the simulation, without the computing time required to (1) compute ellipsoidal shapes for each point in the point cloud, (2) compute a surface to fit the ellipsoids, or (3) do a full render of the image. Thus, if adjustments to the size, shape, position, or interaction of the objects are made at this stage, the process can be quick and convenient. It is understood that the point cloud may be displayed as points or particles, or as spheres, polyhedrons or other shapes of selectable size.

Figure 6:
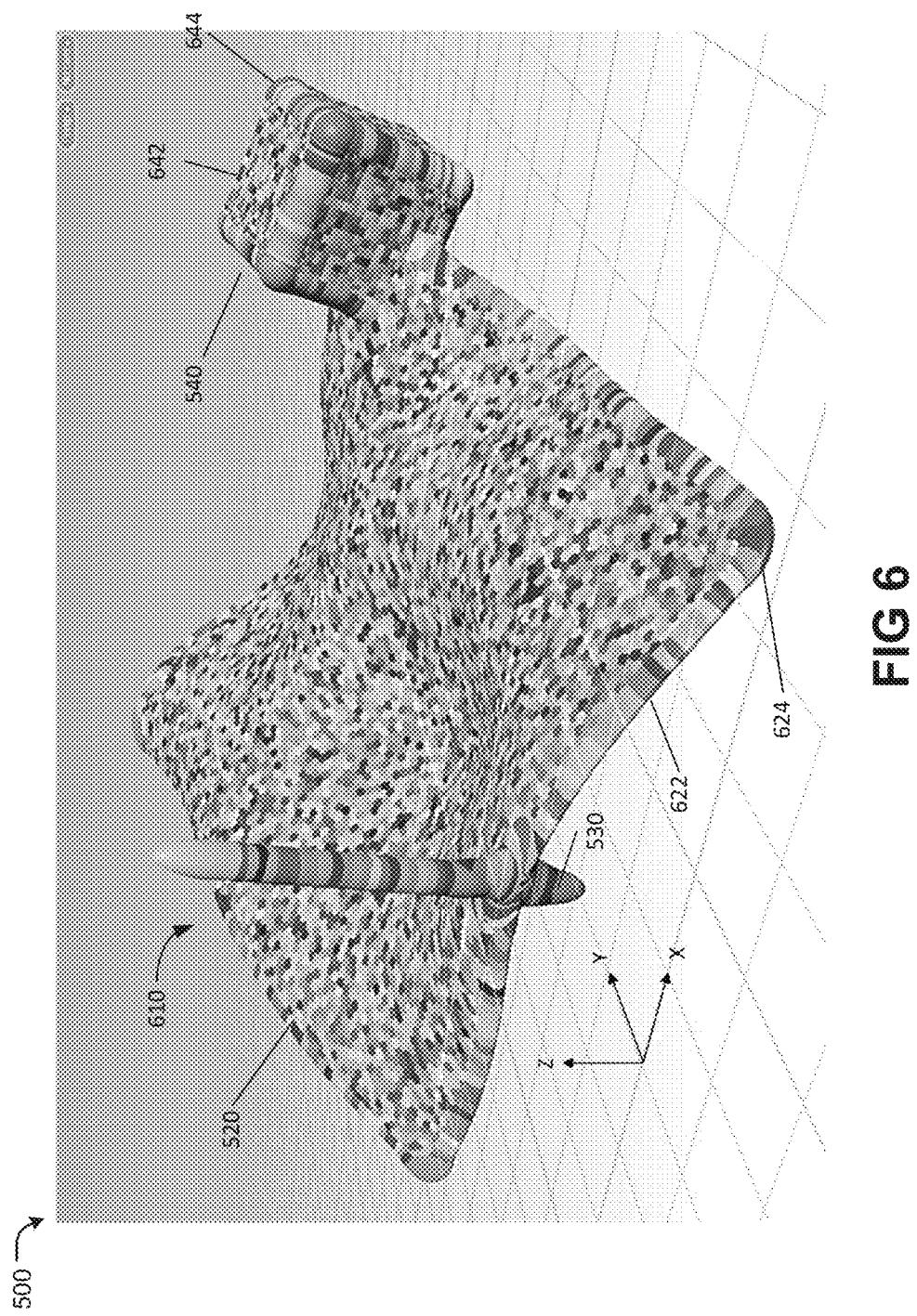
FIG. 6 illustrates the same scene at a later stage of development, wherein the point cloud has been replaced with a cloud of overlapping ellipsoids, in accordance with at least one embodiment of the present disclosure.

FIG. 6 illustrates the same scene 500 at a later stage of development, wherein the point cloud 510 has been replaced with a cloud or plurality of overlapping ellipsoids 610, in accordance with at least one embodiment of the present disclosure. The dimensions and orientation of each ellipsoid depend on the number and direction of its neighbors within a given search radius of the ellipsoid (as described above for example in FIG. 4C), such that, for example, the edges 642 of the cube 540 and the edges 622 of the wave 520 show larger ellipsoids than other areas of the cube or wave, while the corners 644 and 624 show still larger ellipsoids. In this example, the vertical spout 530 consists of very large ellipsoids, because the spout 530 comprises only a single 1D structure, with each ellipsoid having only 1 or 2 neighbors. As described above, this anisotropy helps generate smoother surfaces. There is a burden of computing time associated with computing the positions, orientations, and sizes of these ellipsoids. However, edits made to the scene 500 at this stage (for example, moving, reorienting, or resizing objects, or adjusting the output voxel size, related to the sizes of the ellipsoids) will nevertheless permit the artist to adjust the scene 500 without the computational burden of computing a surface to fit the ellipsoids, or do a full scene render.

Figure 7:
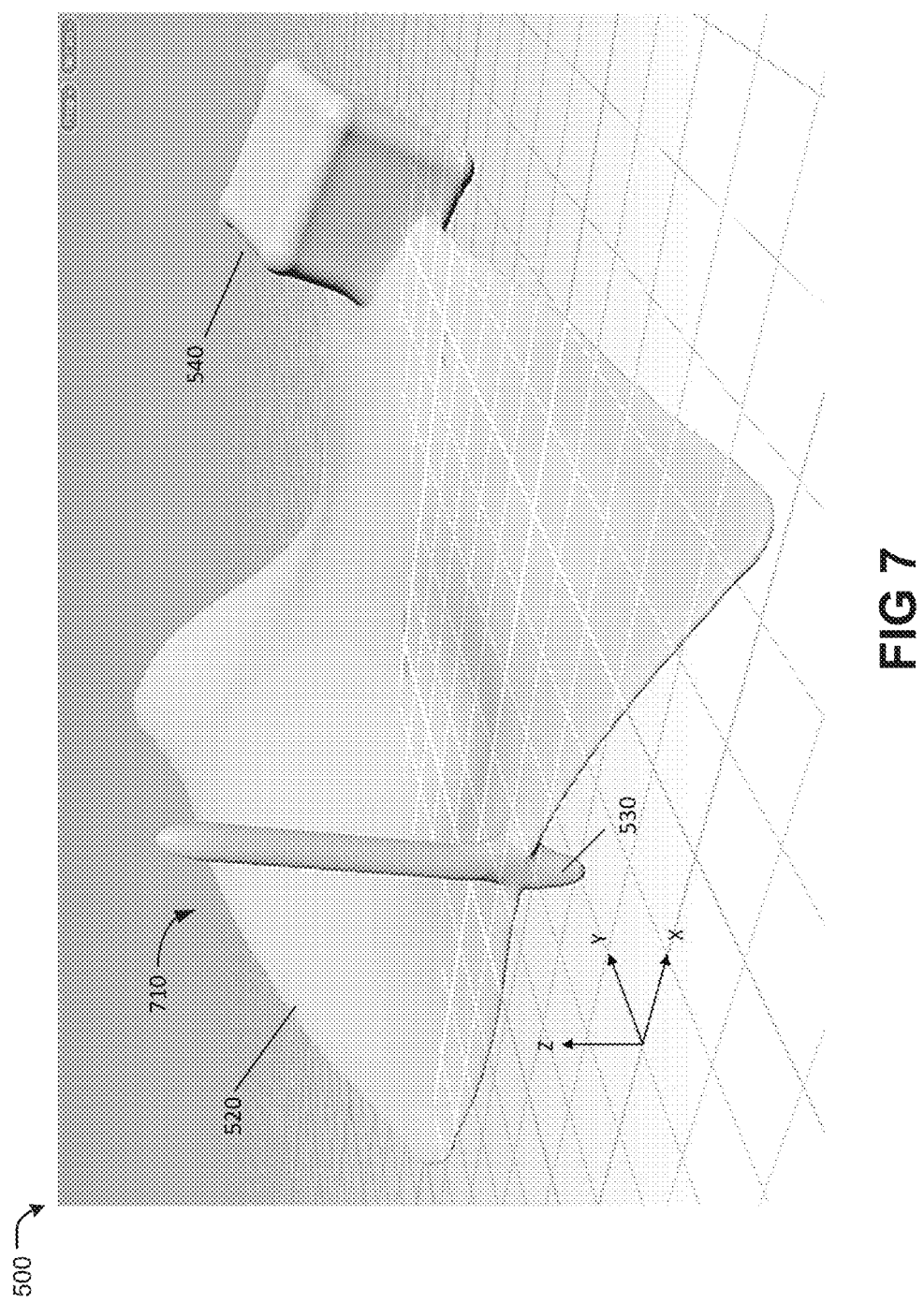
FIG. 7 illustrates the scene with a splatted or rasterized surface in place of the cloud of overlapping ellipsoids, in accordance with at least one embodiment of the present disclosure.

FIG. 7 illustrates scene 500 with splatted or rasterized surfaces 710 in place of the cloud of overlapping ellipsoids 610, in accordance with at least one embodiment of the present disclosure. In the example of FIG. 7, parameters have been selected (e.g., through a user interface as described below in FIG. 11) such that the splatted or rasterized surface is smooth in all locations. However, this may not always be desirable. For example, a wave 520 in the real world may for example include smooth portions as well as rough, foamy, aerated portions. It is therefore desirable for the graphical user interface (GUI) to enable an artist to vary parameters of the scene 500 based on position, or on other factors. Once the artist is happy with the appearance of the scene, a full or partial rendering of the scene can be performed.

Figure 8:
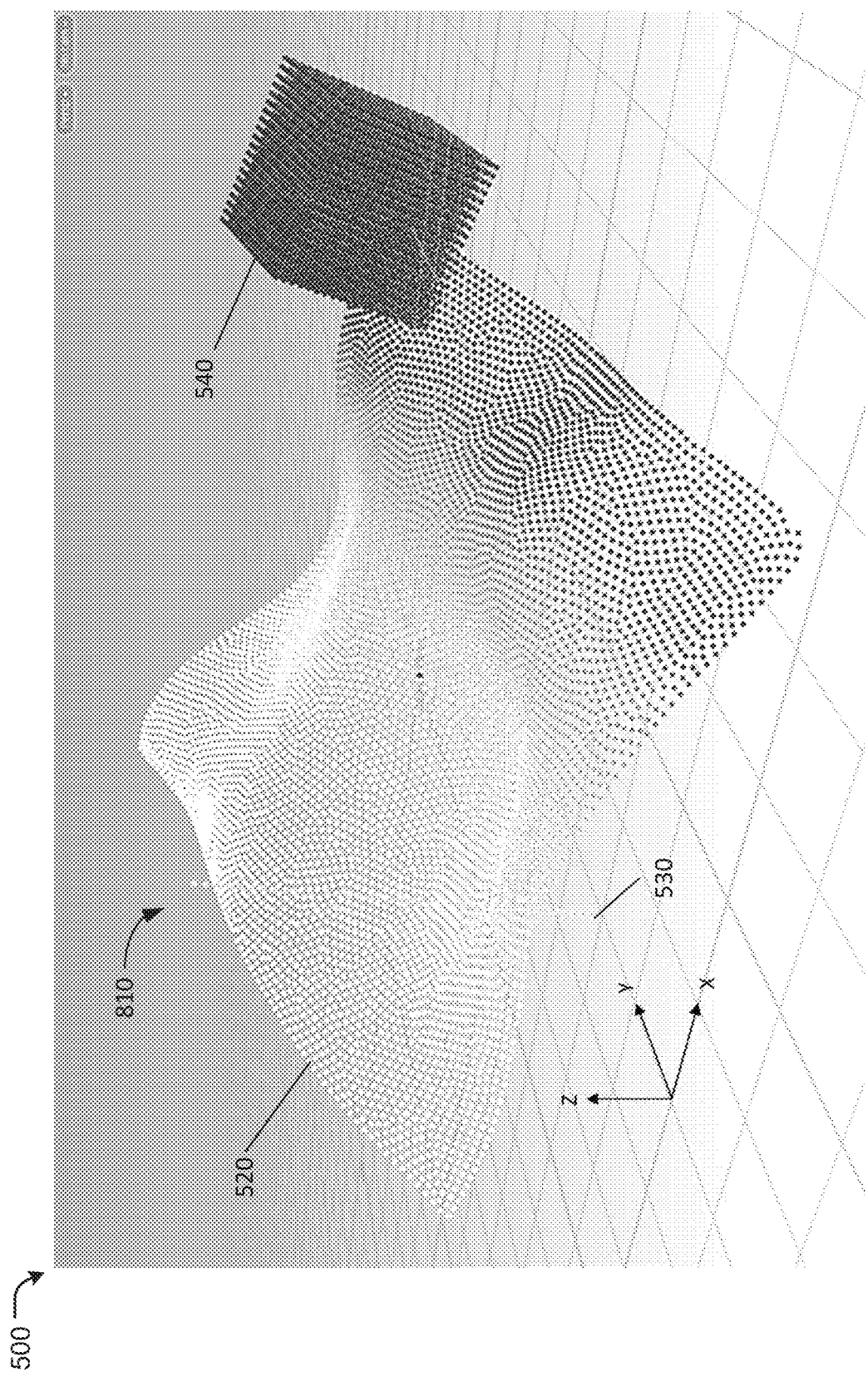
FIG. 8 illustrates the scene with a conditional point cloud, wherein an image parameter is dependent on another variable, in accordance with at least one embodiment of the present disclosure.

FIG. 8 illustrates scene 500 with a conditional point cloud 810, wherein an image parameter is dependent on another variable, in accordance with at least one embodiment of the present disclosure. In the example shown in FIG. 8, the color of each point in the conditional point cloud 810 is dependent on its position along the X-axis, such that points toward the right side of the scene 500 appear darker, whereas points toward the left side of the scene 500 appear lighter. In other examples, other parameters may be conditional on position, or maybe conditional on other variables. For example, a color variable may be conditional on an X, Y, or Z position variable, and a voxel size may be dependent on the color variable. Such conditional effects may be used for example to permit some portions of a wave to be white, while others are blue or transparent.

Figure 9:
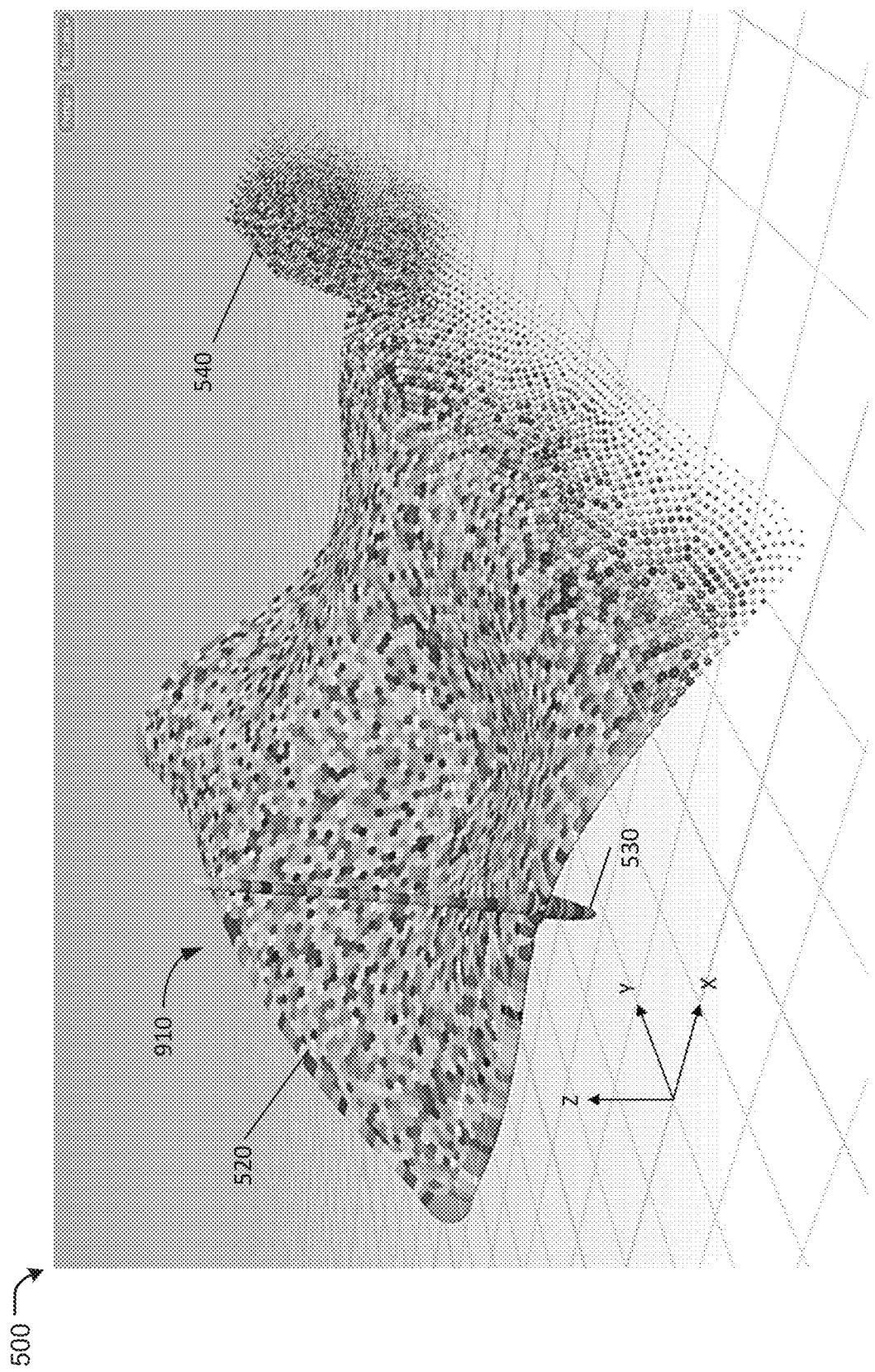
FIG. 9 illustrates the scene with a conditional ellipsoid cloud, in accordance with at least one embodiment of the present disclosure.

FIG. 9 illustrates scene 500 with a conditional ellipsoid cloud 910, in accordance with at least one embodiment of the present disclosure. In the example shown in FIG. 9, the sizes of the ellipsoids are dependent on their position along the X-axis, such that ellipsoids toward the right side of the scene 500 are smaller, whereas ellipsoids toward the left side of the scene 500 are larger. Since the size of the ellipsoids affects the smoothness and continuity of any surface generated from them, an artist editing image parameters at this stage can have a good understanding of how the image will look, without the computational overhead of computing the surface end rendering the image.

Figure 10:
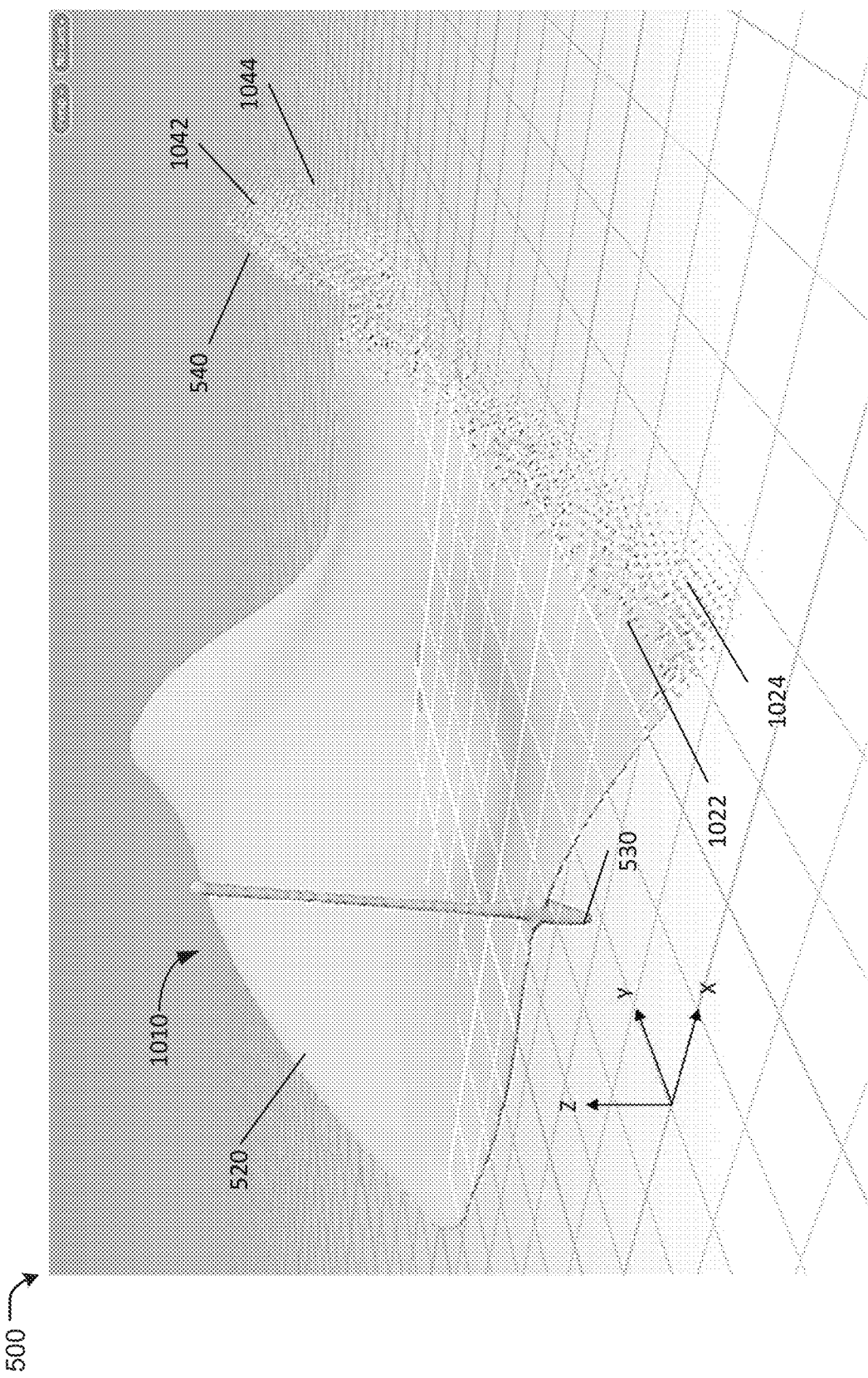
FIG. 10 illustrates the scene with a splatted or rasterized surface computed from the conditional ellipsoid cloud of FIG. 9, in accordance with at least one embodiment of the present disclosure.

FIG. 10 illustrates scene 500 with a splatted or rasterized surface 1010 computed from the conditional ellipsoid cloud 910 of FIG. 9, in accordance with at least one embodiment of the present disclosure. In the example of FIG. 10, portion 1022 of wave 520 and portion 1042 of cube 540 appear foamy, frothy, or aerated, with gaps appearing in a relatively rough surface. Similarly, portion 1024 of wave 520 and portion 1044 of cube 540 appear as individual points, droplets, or spray, each completely surrounded by air and not connected to its neighbor points. An artist making changes at this stage can see the calculated surface, but without the computational overhead of actually rendering the scene. Thus, a person of ordinary skill in the art will appreciate that the present disclosure advantageously provides artists with the ability to view and edit a scene at various stages of development, without the need to generate subsequent visual steps until the results of the present step are deemed satisfactory. This improves the efficiency of artists and reduces the need for computing time.

Figure 11:
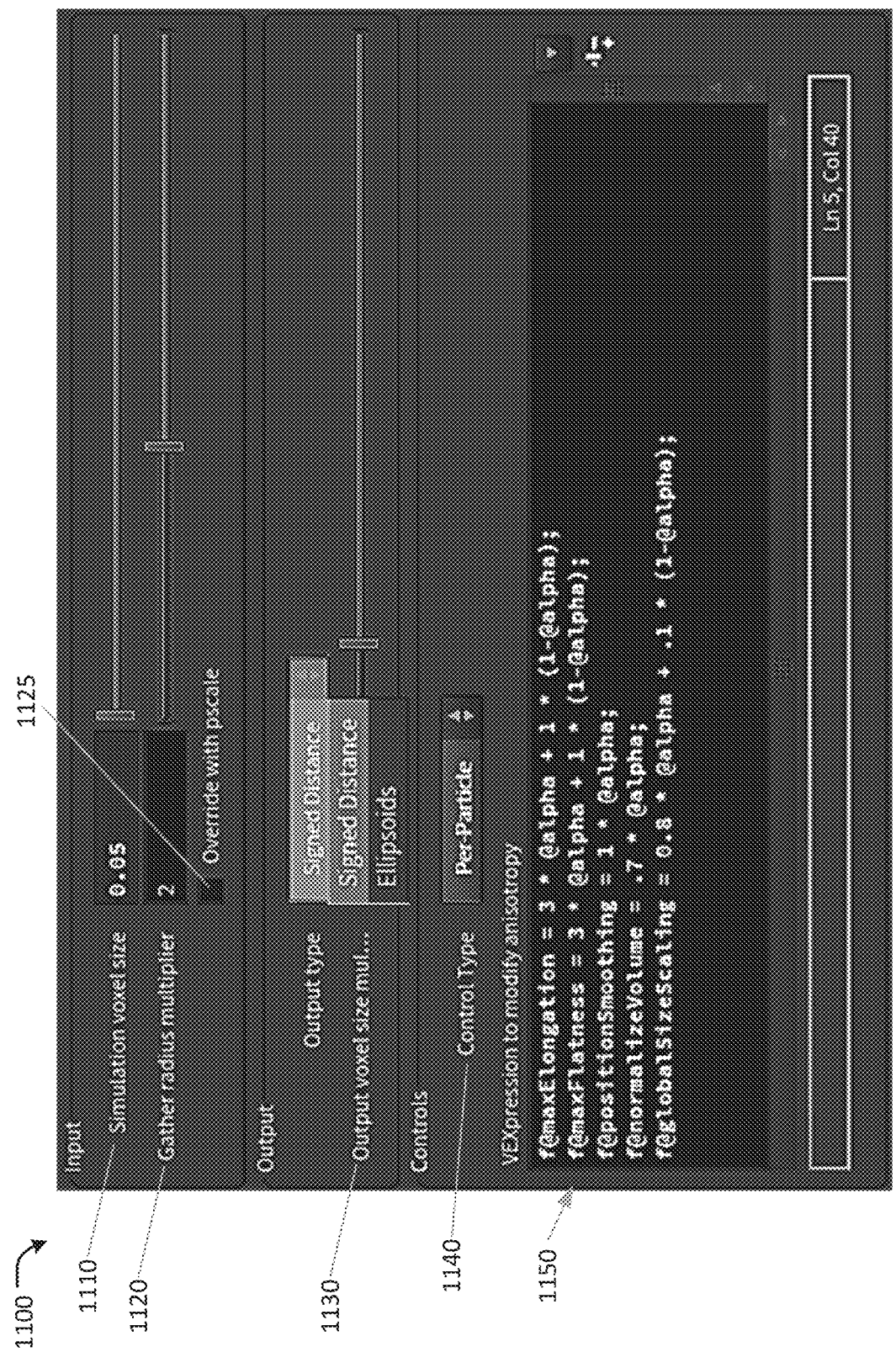
FIG. 11 illustrates an example user interface, in accordance with at least one embodiment of the present disclosure.

FIG. 11 illustrates an example user interface (UI) 1110, in accordance with at least one embodiment of the present disclosure. The surfacing node takes in particles, and performs the neighbor analysis based on Input parameters, which say how far around to a look to analyze each particle's neighborhood. If the artist or operator knows the voxel size the simulation has been run with, a good search radius is on the order of that voxel size, e.g., between 0.5 and 3.0 times the voxel size. Artists also often vary simulation point radius (i.e. instead of simulating with uniform particle size they change it per particle for whatever reason then have). Sometimes it is desired to make the search radius proportional to particle size, so that's what the "Override with pscale" flag 1125 is for. This conveniently permits the artist or operator to proceed without re-tuning the search radius every time.

The Controls block allows the users to manipulate the neighborhood information gathered on each particle. The control mode can either be Global or Per-particle, and that's where the convenience of user-defined masking comes in. Users may employ custom parameters they have previously assigned to particles (like "@alpha" in the example shown in FIG. 11) to modulate the description of particle neighborhoods manifesting themselves as particular shapes of ellipsoids. Each neighborhood/ellipsoid is described by a set of values per particle, such as rotation matrix, and singular values. The artist or operator either manipulates those values directly (e.g., by using a masking control to manually select or define a neighborhood, and one or more artistic controls to define one or more attributes of the particles within the neighborhood, wherein the masking and artistic controls may be known in the art or may be customized to or unique to the system disclosed herein), or uses controls expressed as attributes: @maxElongation, @positionSmoothing etc, which are used by the algorithm internally to modify the ellipsoids, and may be affected using code-like arithmetic expressions as shown.

The output can be set to a fast Ellipsoids mode, so the artist or operator can directly view the particle data as a cloud of colored ellipsoids (as shown for example in FIG. 6), avoiding expensive splatting to surface (as shown for example in FIG. 7). Once the user is happy with the result they can flip it to Signed Distance (and wait longer, since it is more expensive) to obtain and display the splatted or rasterized surfaces of the final renderable volume.

In order to achieve the effects and image development stages described above and shown in FIGS. 5-10, the UI 1110 includes a first slider 1110 for selecting a voxel size employed by the particle simulation, and a second slider 1120 for selecting a "gather radius" or "search radius" that helps to determine how neighboring particles affect one another. The UI 1110 also includes an output type selector, that permits the ability to select the voxel type (spheres, ellipsoids, etc.), as well as a size multiplier slider to determine how output voxel size if affected by neighbor distance. The UI 1110 also includes a control type selector that permits the artist or operator to select how particles are affected by a given variable (e.g., as individual particles, as neighborhoods, globally across the entire point cloud, etc.), and an expression window 1150 that includes code-like expressions to make certain variables (e.g., elongation, flatness, smoothing, volume, and global scaling of the ellipsoids) dependent on another variable (e.g., position, color, etc.). The code-like expressions may for example include variables, constants, or arithmetic operators. With UI 1110, an artist or operator is able to generate the effects and image development stages shown in FIGS. 5-10, much more efficiently than if it were necessary to generate ellipsoids, generate the surface, and render the scene each time a change is made.

In some embodiments, other options may be available, such as the ability to render a scene only in black and white, or the ability to render the scene with a maximum number of vertices per traced light path. As with the other UI options, this permits the artist to make changes at an earlier development stage, while having a good idea what they will look like in the final render, but with much lower computational overhead. Thus, the generation of fluid surfaces can be performed more efficiently and with more realistic results. This combination of improved realism and reduced computing time represents a substantial improvement over the related art.

Figure 12:
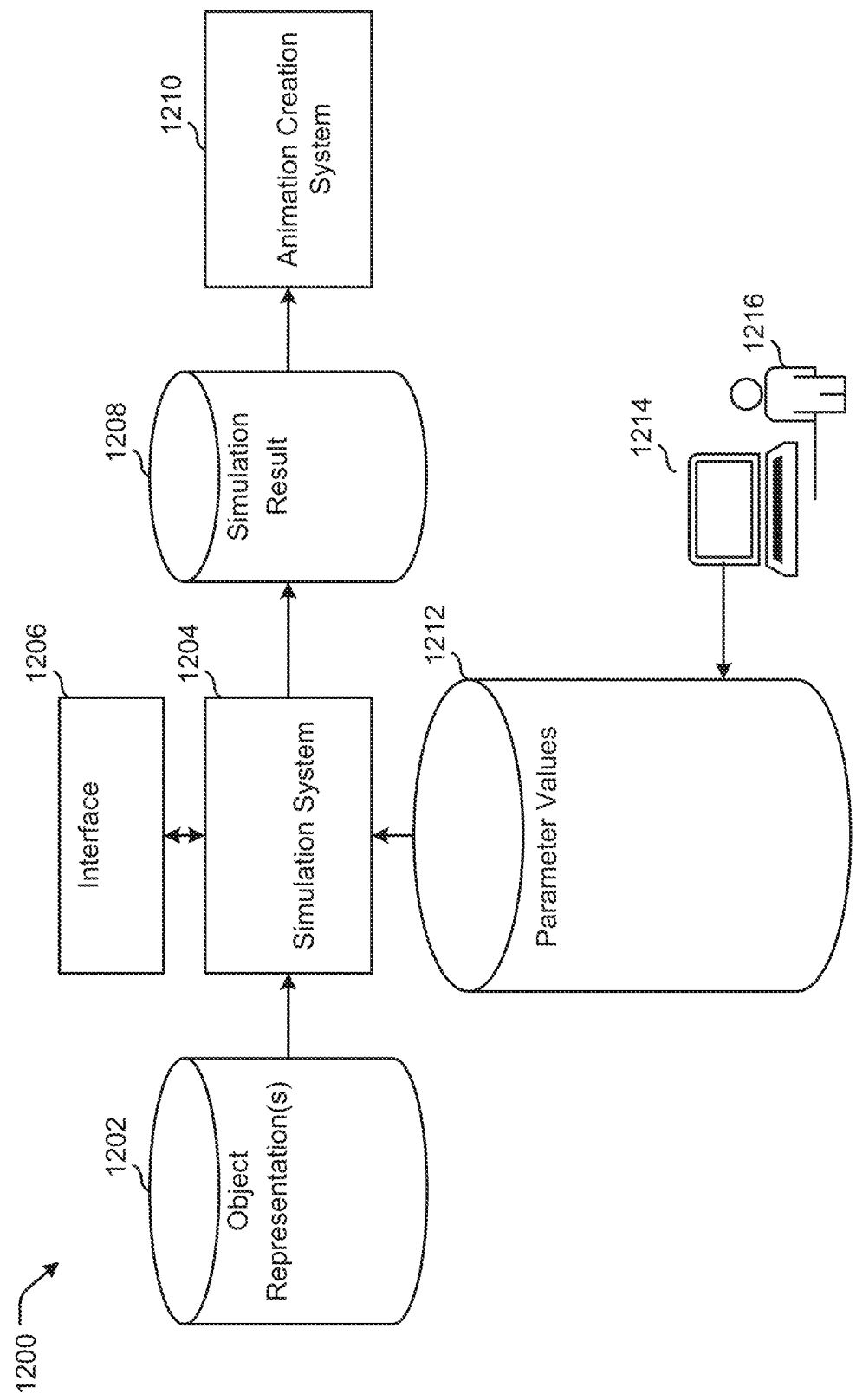
FIG. 12 is a diagram of a data flow through a simulation system.

FIG. 12 is a diagram of a data flow through a simulation system 1200 when the system 1200 is performing a process such as one of those described herein. An input to a simulation system 1204 is object representations 1202, interface details 1206, and parameter values 1212, perhaps obtained by artist or user 1216 input via a computer 1214. An output 1208 of a simulation might be represented in memory and provided for example to an animation creation system 1210.

Figure 13:
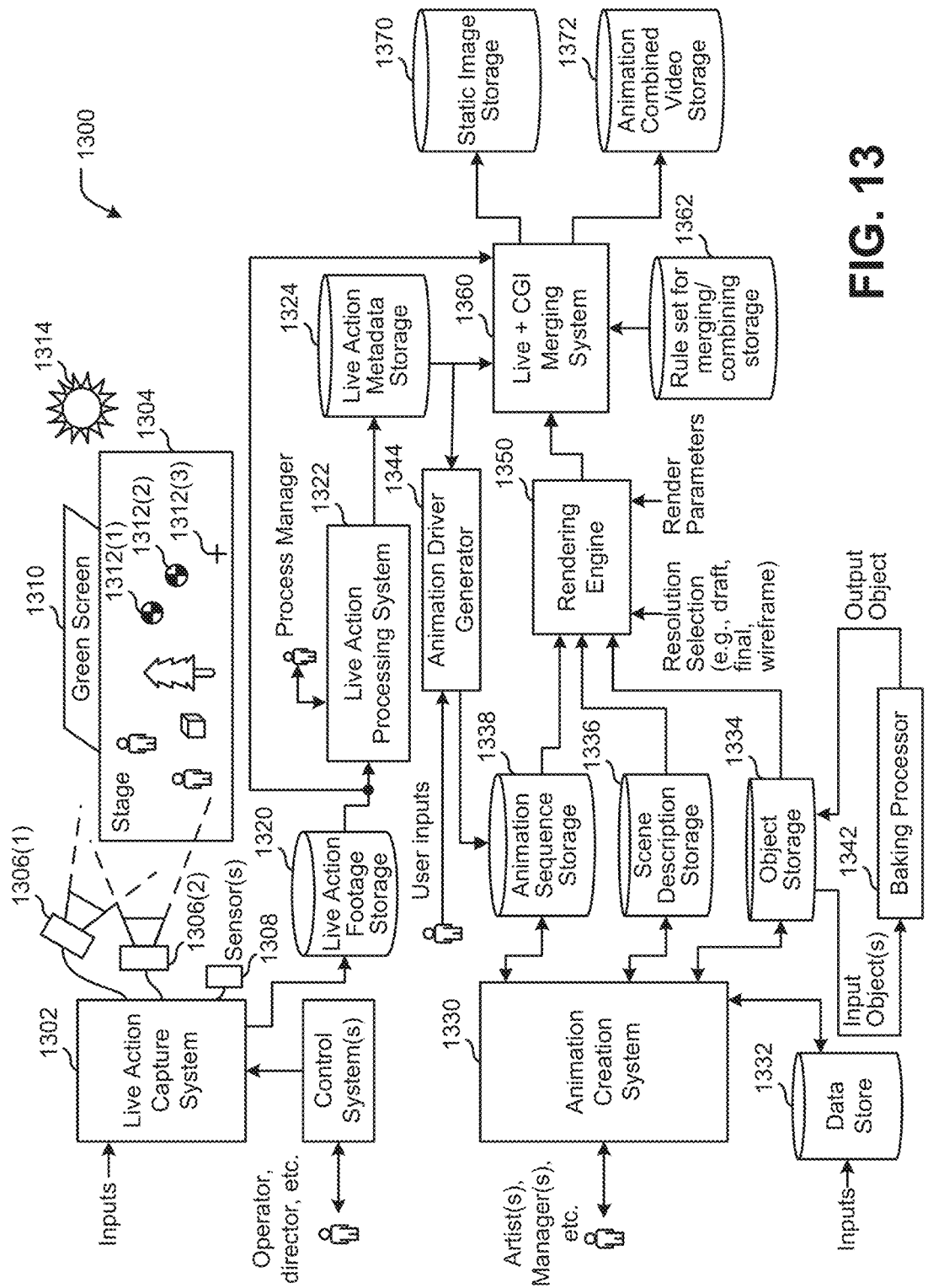
FIG. 13 illustrates an example visual content generation system as might be used to generate imagery in the form of still images and/or video sequences of images.

FIG. 13 illustrates the example visual content generation system 1300 as might be used to generate imagery in the form of still images and/or video sequences of images. Visual content generation system 1300 might generate imagery of live action scenes, computer generated scenes, or a combination thereof. In a practical system, users are provided with tools that allow them to specify, at high levels and low levels where necessary, what is to go into that imagery. For example, a user might be an animation artist like artist or user 1216 illustrated in FIG. 12) and might use visual content generation system 1300 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1300 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera.

The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 13, a live action capture system 1302 captures a live scene that plays out on a stage 1304. Live action capture system 1302 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1306(1) and 1306(2) capture the scene, while in some systems, there might be other sensor(s) 1308 that capture information from the live scene (e.g., infrared cameras, infrared sensors, motion capture ("mo-cap") detectors, etc.). On stage 1304, there might be human actors, animal actors, inanimate objects, background objects, and possibly an object such as a green screen 1310 that is designed to be captured in a live scene recording in such a way that it is easily overlaid with computer-generated imagery. Stage 1304 might also contain objects that serve as fiducials, such as fiducials 1312(1)-(3), that might be used post-capture to determine where an object was during capture. A live action scene might be illuminated by one or more lights, such as an overhead light 1314.

During or following the capture of a live action scene, live action capture system 1302 might output live action footage to a live action footage storage 1320. A live action processing system 1322 might process live action footage to generate data about that live action footage and store that data into a live action metadata storage 1324. Live action processing system 1322 might include computer processing capabilities, image processing capabilities, one or more processors, program code storage for storing program instructions executable by the one or more processors, as well as user input devices and user output devices, not all of which are shown. Live action processing system 1322 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1314, as that might be useful in post-processing to match computer-generated lighting on objects that are computer-generated and overlaid on the live action footage. Live action processing system 1322 might operate autonomously, perhaps based on predetermined program instructions, to generate and output the live action metadata upon receiving and inputting the live action footage. The live action footage can be camera-captured data as well as data from other sensors.

An animation creation system 1330 is another part of visual content generation system 1300. Animation creation system 1330 might include computer processing capabilities, image processing capabilities, one or more processors, program code storage for storing program instructions executable by the one or more processors, as well as user input devices and user output devices, not all of which are shown. Animation creation system 1330 might be used by animation artists, managers, and others to specify details, perhaps programmatically and/or interactively, of imagery to be generated. From user input and data from a database or other data source, indicated as a data store 1332, animation creation system 1330 might generate and output data representing objects (e.g., a horse, a human, a ball, a teapot, a cloud, a light source, a texture, etc.) to an object storage 1334, generate and output data representing a scene into a scene description storage 1336, and/or generate and output data representing animation sequences to an animation sequence storage 1338.

Scene data might indicate locations of objects and other visual elements, values of their parameters, lighting, camera location, camera view plane, and other details that a rendering engine 1350 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1330 might be interactive, allowing a user to read in animation sequences, scene descriptions, object details, etc. and edit those, possibly returning them to storage to update or replace existing data. As an example, an operator might read in objects from object storage into a baking processor 1342 that would transform those objects into simpler forms and return those to object storage 1334 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1332 might be used to drive object presentation. For example, if an artist is creating an animation of a spaceship passing over the surface of the Earth, instead of manually drawing or specifying a coastline, the artist might specify that animation creation system 1330 is to read data from data store 1332 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1344 might read in live action metadata, such as data representing movements and positions of body parts of a live actor during a live action scene. Animation driver generator 1344 might generate corresponding animation parameters to be stored in animation sequence storage 1338 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1322. Animation driver generator 1344 might convert that movement data into specifications of how joints of an articulated CGI character are to move over time.

A rendering engine 1350 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1350 might include computer processing capabilities, image processing capabilities, one or more processors, program code storage for storing program instructions executable by the one or more processors, as well as user input devices and user output devices, not all of which are shown.

Visual content generation system 1300 can also include a merging system 1360 that merges live footage with animated content. The live footage might be obtained and input by reading from live action footage storage 1320 to obtain live action footage, by reading from live action metadata storage 1324 to obtain details such as presumed segmentation in captured images segmenting objects in a live action scene from their background (perhaps aided by the fact that green screen 1310 was part of the live action scene), and by obtaining CGI imagery from rendering engine 1350.

A merging system 1360 might also read data from rulesets for merging/combining storage 1362. A very simple example of a rule in a ruleset might be "obtain a full image including a two-dimensional pixel array from live footage, obtain a full image including a two-dimensional pixel array from rendering engine 1350, and output an image where each pixel is a corresponding pixel from rendering engine 1350 when the corresponding pixel in the live footage is a specific color of green, otherwise output a pixel value from the corresponding pixel in the live footage."

Merging system 1360 might include computer processing capabilities, image processing capabilities, one or more processors, program code storage for storing program instructions executable by the one or more processors, as well as user input devices and user output devices, not all of which are shown. Merging system 1360 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1360, such as modifying boundaries of segmented objects, inserting blurs to smooth out imperfections, or adding other effects. Based on its inputs, merging system 1360 can output an image to be stored in a static image storage 1370 and/or a sequence of images in the form of video to be stored in an animated/combined video storage 1372.

Thus, as described, visual content generation system 1300 can be used to generate video that combines live action with computer-generated animation using various components and tools, some of which are described in more detail herein. While visual content generation system 1300 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 14:
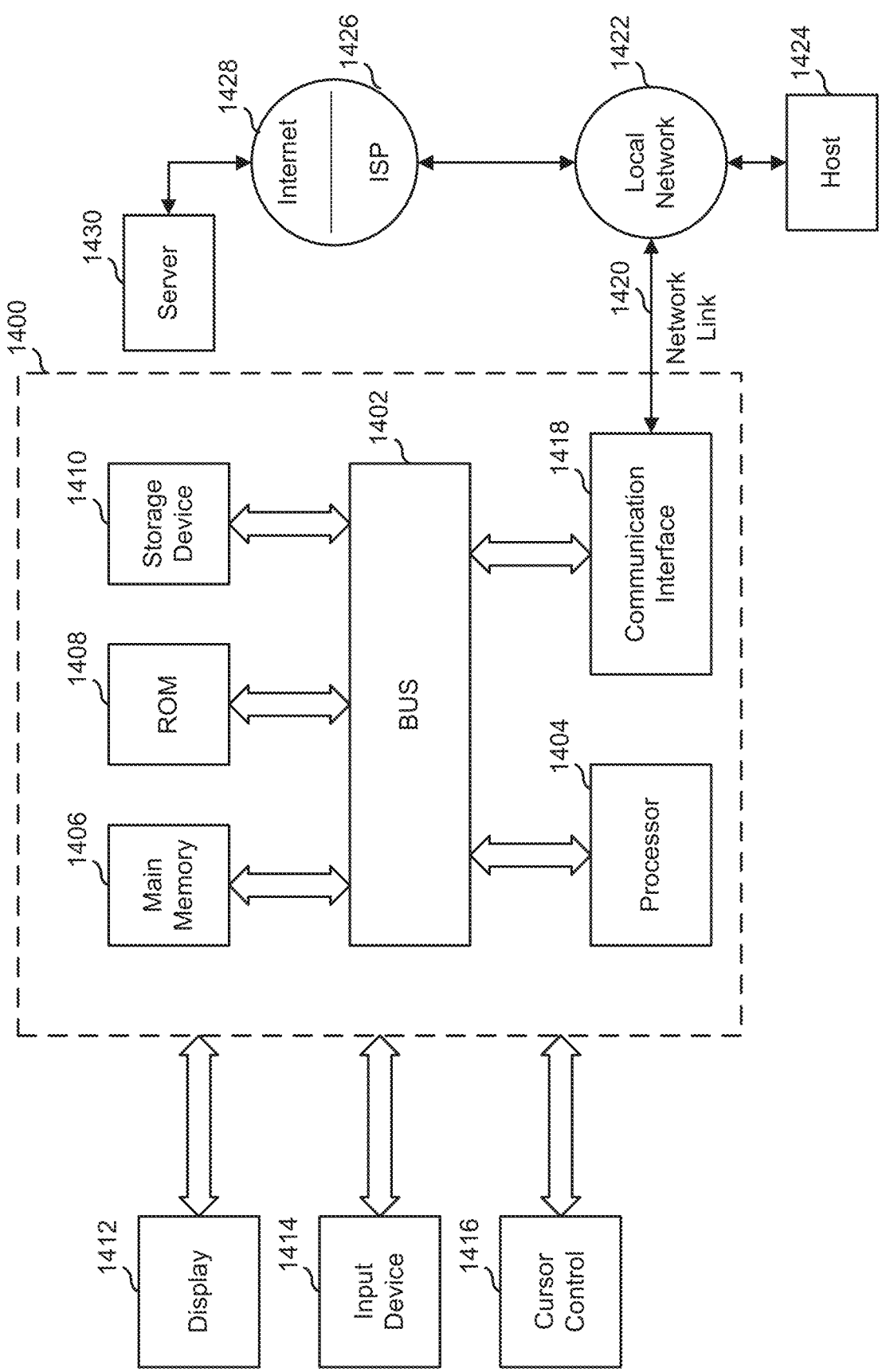
FIG. 14 is a block diagram illustrating an example computer system upon which computer systems of the systems illustrated in FIG. 12 or FIG. 13 may be implemented.

FIG. 14 is a block diagram that illustrates an example computer system 1400 upon which the computer systems of the systems described herein and/or visual content generation system 1300 (see FIG. 13) may be implemented. Computer system 1400 includes a bus 1402 or other communication mechanism for communicating information, and a processor 1404 coupled with bus 1402 for processing information. Processor 1404 may be, for example, a general-purpose microprocessor.

Computer system 1400 also includes a main memory 1406, such as a random-access memory (RAM) or other dynamic storage device, coupled to bus 1402 for storing information and instructions to be executed by processor 1404. Main memory 1406 may also be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a computer monitor, for displaying information to a computer user. An input device 1414, including alphanumeric and other keys, is coupled to bus 1402 for communicating information and command selections to processor 1404. Another type of user input device is a cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a network connection. A modem or network interface local to computer system 1400 can receive the data.

Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be a network card, a modem, a cable modem, or a satellite modem to provide a data communication connection to a corresponding type of telephone line or communications line. Wireless links may also be implemented. In any such implementation, communication interface 1418 sends and receives electrical, electromagnetic, or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world-wide packet data communication network now commonly referred to as the "Internet" 1428. Local network 1422 and Internet 1428 both use electrical, electromagnetic, or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420, and communication interface 1418. In the Internet example, a server 1430 might transmit a requested code for an application program through the Internet 1428, ISP 1426, local network 1422, and communication interface 1418. The received code may be executed by processor 1404 as it is received, and/or stored in storage device 1410, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Directional references e.g., upper, lower, inner, outer, upward, downward, left, right, front, back, top, bottom, above, below, vertical, and horizontal are used for identification purposes to aid the reader's understanding of the claimed subject matter and are not intended to create limitations, particularly as to a position or orientation of simulated objects, or use of the surface computation method. The word "comprising" does not exclude other elements or steps, and the indefinite article "a" or "an" does not exclude a plurality. Unless otherwise noted in the claims, stated values shall be interpreted as illustrative only and shall not be taken to be limiting.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer implemented method for displaying surfaces of simulated objects within a scene at different stages of development, the method comprising:
   receiving a first selection from a user via a first selector of a user interface;
   based on the first selection, displaying at least a portion of the scene on a display as:
   (1) a plurality of particles, wherein the particles of the plurality of particles each comprise a plurality of attributes;
   (2) a plurality of ellipsoids formed from the plurality of particles, wherein dimensions and orientation of the ellipsoids of the plurality of ellipsoids each depend on a number and direction of neighboring ellipsoids within a search radius of the ellipsoid different from the dimensions of the ellipsoid; or
   (3) one or more splatted or rasterized surfaces formed from the plurality of ellipsoids; and
   receiving editorial inputs from the user via the user interface to modify attributes of the particles, or dimensions or orientations of the ellipsoids, while the at least a portion of the scene is displayed on the display.

2. A computer implemented method for displaying surfaces of simulated objects within a scene at different stages of development, the method comprising:
   receiving a first selection from a user via a first selector of a user interface;
   based on the first selection, displaying at least a portion of the scene on a display as:
   (1) a plurality of particles, wherein at least some particles of the plurality of particles each comprise a plurality of attributes;
   (2) a plurality of ellipsoids formed from the plurality of particles, wherein dimensions and orientation of at least some ellipsoids of the plurality of ellipsoids each depend on a number and direction of neighboring ellipsoids within a search radius of the ellipsoid; or
   (3) one or more splatted or rasterized surfaces formed from the plurality of ellipsoids; and
   receiving editorial inputs from the user via the user interface to modify attributes of the at least some particles, or dimensions or orientations of the at least some ellipsoids, while the at least a portion of the scene is displayed on the display,
   wherein modifying attributes of the at least some particles comprises adjusting a voxel size or particle size of the at least some particles.

3. The computer implemented method of claim 2, wherein modifying dimensions or orientations of the at least some ellipsoids comprises adjusting the search radius.

4. The computer implemented method of claim 3, wherein the editorial inputs from the user specify whether to make the search radius proportional to the particle size.

5. The computer implemented method of claim 1, wherein the plurality of attributes comprises at least one of an X-coordinate, a Y-coordinate, a Z-coordinate, an anisotropy matrix, a rotation matrix, a size, a color, a maximum elongation, a position smoothing, a volume normalization, or a global size scaling.

6. The computer implemented method of claim 1, further comprising receiving one or more masking inputs from the user via the user interface to define a neighborhood of particles.

7. The computer implemented method of claim 6, further comprising receiving one or more artistic inputs from the user via the user interface to manipulate one or more attributes of particles within the neighborhood of particles.

8. A computer implemented method for displaying surfaces of simulated objects within a scene at different stages of development, the method comprising:
receiving a first selection from a user via a first selector of a user interface;
based on the first selection, displaying at least a portion of the scene on a display as:
(1) a plurality of particles, wherein at least some particles of the plurality of particles each comprise a plurality of attributes;
(2) a plurality of ellipsoids formed from the plurality of particles, wherein dimensions and orientation of at least some ellipsoids of the plurality of ellipsoids each depend on a number and direction of neighboring ellipsoids within a search radius of the ellipsoid; or
(3) one or more splatted or rasterized surfaces formed from the plurality of ellipsoids;
receiving editorial inputs from the user via the user interface to modify attributes of the at least some particles, or dimensions or orientations of the at least some ellipsoids, while the at least a portion of the scene is displayed on the display; and
receiving from the user, via the user interface, an expression that defines a relationship between a first attribute of the plurality of attributes and a second attribute of the plurality of attributes.

9. The computer implemented method of claim 8, wherein the expression includes one or more arithmetic operations.

10. The computer implemented method of claim 9, wherein the expression includes one or more constants.

11. The computer implemented method of claim 8, further comprising receiving from the user, via the user interface, a functional selection of whether the expression affects the particles within a neighborhood globally or per-particle.

12. The computer implemented method of claim 1, further comprising receiving from the user a color selection of whether to display the at least a portion of the scene in monochrome or in color.

13. The computer implemented method of claim 1, further comprising receiving from the user a render selection of whether to render the at least a portion of the scene.

14. A computer implemented method for displaying surfaces of simulated objects within a scene at different stages of development, the method comprising:
receiving a first selection from a user via a first selector of a user interface;
based on the first selection, displaying at least a portion of the scene on a display as:
(1) a plurality of particles, wherein at least some particles of the plurality of particles each comprise a plurality of attributes;
(2) a plurality of ellipsoids formed from the plurality of particles, wherein dimensions and orientation of at least some ellipsoids of the plurality of ellipsoids each depend on a number and direction of neighboring ellipsoids within a search radius of the ellipsoid; or
(3) one or more splatted or rasterized surfaces formed from the plurality of ellipsoids;
receiving editorial inputs from the user via the user interface to modify attributes of the at least some particles, or dimensions or orientations of the at least some ellipsoids, while the at least a portion of the scene is displayed on the display; and
receiving from the user a render selection of whether to render the at least a portion of the scene,
wherein the render selection includes whether to render the scene with a maximum number of vertices per traced light path.

15. The computer implemented method of claim 1, wherein the scene is two-dimensional or three-dimensional.

16. A computer system comprising:
one or more processors; and
a non-transitory storage medium storing instructions, which when executed by the one or more processors, cause the computer system to implement the computer implemented method of claim 1.

17. A non-transitory computer-readable storage medium storing instructions, which when executed by at least one processor of a computer system, causes the computer system to implement the computer implemented method of claim 1.

18. A non-transitory carrier medium carrying image data of the scene that has been processed by the computer implemented method of claim 1.

19. The computer implemented method of claim 2, wherein the plurality of attributes comprises at least one of an X-coordinate, a Y-coordinate, a Z-coordinate, an anisotropy matrix, a rotation matrix, a size, a color, a maximum elongation, a position smoothing, a volume normalization, or a global size scaling.

20. The computer implemented method of claim 2, further comprising receiving one or more masking inputs from the user via the user interface to define a neighborhood of particles.

21. The computer implemented method of claim 20, further comprising receiving one or more artistic inputs from the user via the user interface to manipulate one or more attributes of particles within the neighborhood of particles.

22. The computer implemented method of claim 8, wherein the plurality of attributes comprises at least one of an X-coordinate, a Y-coordinate, a Z-coordinate, an anisotropy matrix, a rotation matrix, a size, a color, a maximum elongation, a position smoothing, a volume normalization, or a global size scaling.

23. The computer implemented method of claim 8, further comprising receiving one or more masking inputs from the user via the user interface to define a neighborhood of particles.

24. The computer implemented method of claim 23, further comprising receiving one or more artistic inputs from the user via the user interface to manipulate one or more attributes of particles within the neighborhood of particles.

25. The computer implemented method of claim 14, wherein the plurality of attributes comprises at least one of an X-coordinate, a Y-coordinate, a Z-coordinate, an anisotropy matrix, a rotation matrix, a size, a color, a maximum elongation, a position smoothing, a volume normalization, or a global size scaling.

26. The computer implemented method of claim 14, further comprising receiving one or more masking inputs from the user via the user interface to define a neighborhood of particles.

27. The computer implemented method of claim 26, further comprising receiving one or more artistic inputs from the user via the user interface to manipulate one or more attributes of particles within the neighborhood of particles.

28. The computer implemented method of claim 2, further comprising receiving from the user a color selection of whether to display the at least a portion of the scene in monochrome or in color.

29. The computer implemented method of claim 2, further comprising receiving from the user a render selection of whether to render the at least a portion of the scene.

30. The computer implemented method of claim 8, further comprising receiving from the user a color selection of whether to display the at least a portion of the scene in monochrome or in color.

31. The computer implemented method of claim 8, further comprising receiving from the user a render selection of whether to render the at least a portion of the scene.

32. The computer implemented method of claim 14, further comprising receiving from the user a color selection of whether to display the at least a portion of the scene in monochrome or in color.

33. The computer implemented method of claim 2, wherein the scene is two-dimensional or three-dimensional.

34. A computer system comprising:
one or more processors; and
a non-transitory storage medium storing instructions, which when executed by the one or more processors, cause the computer system to implement the computer implemented method of claim 2.

35. A non-transitory computer-readable storage medium storing instructions, which when executed by at least one processor of a computer system, causes the computer system to implement the computer implemented method of claim 2.

36. A non-transitory carrier medium carrying image data of the scene that has been processed by the computer implemented method of claim 2.

37. The computer implemented method of claim 8, wherein the scene is two-dimensional or three-dimensional.

38. A computer system comprising:
one or more processors; and
a non-transitory storage medium storing instructions, which when executed by the one or more processors, cause the computer system to implement the computer implemented method of claim 8.

39. A non-transitory computer-readable storage medium storing instructions, which when executed by at least one processor of a computer system, causes the computer system to implement the computer implemented method of claim 8.

40. A non-transitory carrier medium carrying image data of the scene that has been processed by the computer implemented method of claim 8.

* * * * *